US008063145B2

(12) United States Patent
Okabe

(10) Patent No.: US 8,063,145 B2
(45) Date of Patent: Nov. 22, 2011

(54) GOLF BALL

(75) Inventor: Satoko Okabe, Kobe (JP)

(73) Assignee: SRI Sports Limited, Kobe (JP)

( * ) Notice: Subject to any disclaimer, the term of this patent is extended or adjusted under 35 U.S.C. 154(b) by 279 days.

(21) Appl. No.: 12/005,378

(22) Filed: Dec. 27, 2007

(65) Prior Publication Data

US 2008/0161129 A1    Jul. 3, 2008

(30) Foreign Application Priority Data

Dec. 28, 2006  (JP) ................................. 2006-356549

(51) Int. Cl.
*A63B 37/12* (2006.01)
*A63B 37/00* (2006.01)
*C08L 33/02* (2006.01)
*C08L 67/04* (2006.01)
*C08L 67/02* (2006.01)

(52) U.S. Cl. .......... 525/166; 525/64; 525/174; 525/175; 525/176; 528/272; 528/302; 528/361; 473/378; 473/385

(58) Field of Classification Search .................. None
See application file for complete search history.

(56) References Cited

U.S. PATENT DOCUMENTS

| 4,221,703 | A | * | 9/1980 | Hoeschele .................... 524/222 |
| 4,884,814 | A | | 12/1989 | Sullivan |
| 5,565,524 | A | | 10/1996 | Hamada et al. |
| 5,652,325 | A | * | 7/1997 | Miyazaki et al. ............. 528/283 |
| 5,869,578 | A | | 2/1999 | Rajagopalan |
| 5,889,114 | A | * | 3/1999 | Statz ............................. 525/166 |
| 6,037,419 | A | | 3/2000 | Takesue et al. |
| 6,174,247 | B1 | | 1/2001 | Higuchi et al. |
| 6,274,669 | B1 | * | 8/2001 | Rajagopalan .................. 525/64 |
| 6,517,250 | B1 | * | 2/2003 | Ohira et al. .................... 384/527 |
| 6,803,443 | B1 | * | 10/2004 | Ariga et al. .................... 528/354 |
| 7,091,269 | B2 | | 8/2006 | Takesue et al. |
| 7,638,580 | B2 | | 12/2009 | Sasaki et al. |
| 2001/0020067 | A1 | * | 9/2001 | Harris et al. .................. 525/176 |
| 2002/0096801 | A1 | * | 7/2002 | Puniello et al. ............... 264/278 |
| 2004/0028927 | A1 | * | 2/2004 | Leckey et al. ................. 428/481 |
| 2004/0209701 | A1 | | 10/2004 | Finkel |
| 2004/0235586 | A1 | | 11/2004 | Chen |
| 2005/0020783 | A1 | | 1/2005 | Takesue et al. |
| 2006/0147695 | A1 | | 7/2006 | Serizawa et al. |
| 2006/0178471 | A1 | | 8/2006 | Sasaki et al. |
| 2006/0205534 | A1 | | 9/2006 | Egashira et al. |
| 2007/0026972 | A1 | | 2/2007 | Isogawa et al. |
| 2008/0207353 | A1 | | 8/2008 | Sullivan |
| 2009/0082137 | A1 | * | 3/2009 | Okabe ........................... 473/385 |
| 2009/0171037 | A1 | | 7/2009 | Aoshima et al. |
| 2011/0009531 | A1 | | 1/2011 | Aoshima et al. |

FOREIGN PATENT DOCUMENTS

| GB | 2 264 302 | A | 8/1993 |
| JP | 1-308577 | A | 12/1989 |
| JP | 5-277208 | A | 10/1993 |
| JP | 7-132152 | A | 5/1995 |
| JP | 8-182777 | A | 7/1996 |
| JP | 10-137364 | A | 5/1998 |
| JP | 11-500776 | A | 1/1999 |
| JP | 11-80522 | A | 3/1999 |
| JP | 11-104271 | A | 4/1999 |
| JP | 2002-114899 | A | 4/2002 |
| JP | 2003-3052 | A | 1/2003 |
| JP | 2003-119402 | A | 4/2003 |
| JP | 2003-342452 | A | 12/2003 |
| JP | 2004-204195 | A | 7/2004 |
| JP | 2005-13487 | A | 1/2005 |
| JP | 2005-29601 | A | 2/2005 |
| JP | 2005-60474 | A | 3/2005 |
| JP | 2005-60556 | A | 3/2005 |
| JP | 2005-60691 | A | 3/2005 |
| JP | 2005-307078 | A | 11/2005 |
| JP | 2005-323637 | A | 11/2005 |
| JP | 2005-336238 | A | 12/2005 |
| JP | 2006-28333 | A | 2/2006 |
| JP | 2006-96836 | A | 4/2006 |
| JP | 2006-205646 | A | 8/2006 |
| JP | 2006-218046 | A | 8/2006 |
| JP | 2006-247224 | A | 9/2006 |
| JP | 2006-341021 | A | 12/2006 |
| JP | 2008-264038 | A | 11/2008 |
| WO | WO 2006/115226 | A1 | 11/2006 |

OTHER PUBLICATIONS

Showa Highpolymer BIONOLLE product data sheet; no date.*
Ahn, Synthesis and Characterization of the Biodegradable Copolymers from Succinic Acid and Adipic Acid with Butanediol, Journal of Applied Polymer Science vol. 82 (2001) pp. 2808-2826.*
Office Action for corresponding U.S. Appl. No. 12/232,806 dated Mar. 11, 2011.
Eric Thain; Science and Golf IV; "Proceedings of the World Scientific Congress of Golf"; 2002; pp. 319-327.
Office Action dated Jul. 26, 2011 of U.S. Appl. No. 12/232,806.

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball which is superior in durability to a golf ball having an ionomer resin cover which has conventionally been used. Another object of the present invention is to provide a golf ball using a non-petroleum based material. The golf ball of the present invention comprises a core and a cover covering the core, wherein at least either the core or the cover includes, as a resin component, a polyester resin containing a non-petroleum based material as a constitutional component.

4 Claims, No Drawings

GOLF BALL

BACKGROUND OF THE INVENTION

1. Field of the Invention

The present invention relates to a golf ball, more particularly to improving durability of the golf ball.

2. Description of the Related Art

A golf ball is required to have durability since it is repeatedly hit. As a material constituting a cover of a golf ball, ionomer resins are known. Since a golf ball having an ionomer resin cover is relatively rigid, it is excellent in resilience, durability, and workability. However, it has a problem of poor shot feeling and controllability.

Therefore, Japanese patent publications Nos. H01-308577, H05-277208, H07-132152 and H08-182777 and PCT International Application Japanese Translation No. H11-500776, for example, propose an improvement of shot feeling and controllability of an ionomer resin cover. Japanese patent publication No. H01-308577, for example, discloses a technology of blending a rigid ionomer resin and a flexible ionomer resin. Japanese patent publication No. H05-277208 discloses a technology using two or more ionomer resins having a relatively low modulus value. Japanese patent publication No. H07-132152 discloses a use of a heated mixture of an ionomer resin; a ternary copolymer resin consisting of α-olefin, an unsaturated carboxylic acid ester and an unsaturated carboxylic acid; and a glycidyl group-containing α-olefin copolymerized resin as a base resin of a cover. Japanese patent publication No. H08-182777 discloses a heated mixture of three kinds consisting of an ionomer resin, an anhydrous maleic acid modified olefin copolymer and a glycidyl group modified styrene base block copolymer with JIS-A hardness of 30 to 90 as a base resin of a cover. PCT International Application Japanese Translation No. H11-500776 discloses a process for producing a golf ball cover composition, which process comprises: a) forming a polymer comprising a first monomeric component comprising an olefinic monomer having from 2 to 8 carbon atoms; a second monomeric component comprising an unsaturated carboxylic acid based acrylate class ester having from 4 to 22 carbon atoms; and an optional third monomeric component comprising at least one monomer selected from the group consisting of carbon monoxide, sulfur dioxide, an anhydride monomer, an unsaturated monocarboxylic acid, an olefin having from 2 to 8 carbon atoms, and a vinyl ester or vinyl ether of an alkyl acid having from 4 to 21 carbon atoms; and saponifying the polymer with an inorganic metal base to obtain a polymer salt having a saponification degree of about 1 to 50%.

In recent years, a use of a biodegradable resin as a polymer material has been under study from a viewpoint of environmental conservation. For example, each of Japanese patent publication No. 2006-247224 and US Patent publication No. 2004/0209701 discloses a golf ball using a biodegradable resin.

SUMMARY OF THE INVENTION

As described above, various materials have been studied for improving properties of golf balls. The present invention has been achieved under the above circumstances. An object of the present invention is to provide a golf ball which is superior in durability to a golf ball having an ionomer resin cover which has been conventionally used. Another object of the present invention is to provide a golf ball using a non-petroleum based material.

The golf ball of the present invention that has achieved the above objects is a golf ball having a core and a cover covering the core, wherein at least either the core or the cover contains, as a resin component, a polyester resin having a non-petroleum based material as a constitutional component. The present inventor has intensively studied the above problems, and completed the present invention with a finding that if at least either the core or the cover contains, as a resin component, a polyester resin having a non-petroleum based material as a constitutional component, durability of the resultant golf ball markedly improves. Examples of the polyester resin include one having (a) a dicarboxylic acid, (b) a diol and/or a hydroxy carboxylic acid as a constitutional component wherein at least one of (a) the dicarboxylic acid and (b) the diol and/or the hydroxy carboxylic acid is a non-petroleum based material.

Slab hardness of the polyester resin is preferably 70 or less in shore D hardness. If the shore D hardness is 70 or less, durability of the resultant golf ball will be further enhanced.

In a preferred embodiment of the present invention, the cover contains, as a resin component, a mixture of the polyester resin and at least one kind of petroleum-based thermoplastic resin selected from the group consisting of an ionomer resin, a polyurethane resin, a polystyrene resin, a polyester resin, and a polyamide resin. By employing such a structure, abrasion-resistance as well as durability can be improved. Preferably, the cover further contains a compatibilizer of the polyester resin and at least one kind of petroleum-based thermoplastic resin selected from the group consisting of an ionomer resin, a polyurethane resin, a polystyrene resin, a polyester resin, and a polyamide resin. A content of the polyester resin having a non-petroleum based material as a constitutional component in the mixture is preferably 30 mass % to 100 mass %.

The present invention includes a golf ball comprising a core and a cover covering the core, wherein the cover contains a mixture of a polyester resin and an ionomer resin as a resin component and an epoxy group modified (meth)acrylic resin as a compatibilizer; the polyester resin has, (a) a dicarboxylic acid, (b) a diol and/or a hydroxy carboxylic acid as a constitutional component; at least one of (a) the dicarboxylic acid and (b) the diol and/or the hydroxy carboxylic acid is a non-petroleum based material; and the polyester resin has slab hardness of 70 or less in shore D hardness.

The present invention provides a golf ball which is excellent in durability, using a non-petroleum based material. Further, the present invention provides a golf ball which is excellent in abrasion-resistance as well as durability.

DESCRIPTION OF THE PREFERRED EMBODIMENT

The golf ball of present invention comprises a core and a cover covering the core, wherein at least either the core or the cover contains, as a resin component, a polyester resin having a non-petroleum based material as a constitutional component.

First, the polyester resin having a non-petroleum based material as a constitutional component (hereinafter, simply referred to as "non-petroleum based polyester resin" occasionally) will be explained.

The non-petroleum based polyester resin may be a polyester resin having (a) a dicarboxylic acid, (b) a diol and/or a hydroxy carboxylic acid as a constitutional component, wherein at least one of (a) the dicarboxylic acid and (b) the diol and/or the hydroxy carboxylic acid is a non-petroleum based material. Such examples include a copolymer polyester resin comprising the dicarboxylic acid and the diol as the constitutional component wherein at least one of the dicarboxylic acid and the diol is the non-petroleum based material; a copolymer polyester resin comprising the dicarboxylic acid, the diol and the hydroxy carboxylic acid as constitutional components, wherein at least one of the dicarboxylic acid, the diol, and the hydroxy carboxylic acid is a non-petroleum based material; and a copolymer polyester resin comprising a polyhydroxy carboxylic acid block, the dicarboxylic acid and the diol as constitutional components, wherein at least one of the dicarboxylic acid, the diol, and the hydroxy carboxylic acid is a non-petroleum based material. The non-petroleum based polyester resin can be produced by a method which is known to the public.

Here, the non-petroleum based material is not a material obtained by subjecting petroleum to purification, catalytic reforming and catalytic cracking, but is a material derived from a plant such as a corn, a potato, a beet, and a sugarcane. For example, it can be obtained by processing the corn, potato, beet, sugarcane and the like into a starch or a sugar (such as cellulose) and then fermenting the resultant starch using a microorganism. Additionally, the non-petroleum based material can be produced by a publicly known method of fermentation and/or chemical conversion method using a vegetable oil and an animal oil.

The dicarboxylic acid (a) is not particularly limited as long as it is an organic compound having two carboxyl groups in a molecule, and such examples of the dicarboxylic acid include succinic acid, adipic acid, azelaic acid, sebacic acid, dodecane dicarboxylic acid, anhydrous maleic acid, fumaric acid, 1,3-cyclopentane dicarboxylic acid, terephthalic acid, isophthalic acid, 1,4-naphthalene dicarboxylic acid, 2,5-naphthalene dicarboxylic acid, 2,6-naphthalene dicarboxylic acid, 1,8-naphthalene dicarboxylic acid and biphenyl dicarboxylic acid. These can be used alone or as a mixture of two or more kinds. Among them, succinic acid, adipic acid, fumaric acid, malic acid, pyruvic acid and the like may be preferably used as the non-petroleum based material.

The diol (b) is not particularly limited as long as it is an organic compound having two hydroxyl groups in a molecule. Such examples include a diol such as ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, dipropylene glycol, tripropylene glycol, 1,4-cyclohexane diol, and bisphenol A. These can be used alone or as a mixture of two or more kinds. Among them, 1,4-butanediol, 1,3-propanediol, and ethylene glycol are preferably used as non-petroleum based materials.

The hydroxy carboxylic acid is not particularly limited as long as it is an organic compound having one hydroxyl group and one carboxyl group in a molecule, respectively. Such examples include lactic acid, hydroxy acetic acid (glycolic acid), hydracrylic acid, hydroxybutyric acid, hydroxyvaleric acid, hydroxycyclohexane carboxylic acid, salicylic acid, hydroxybenzoic acid, and hydroxy toluic acid. These can be used alone or as a mixture of two or more kinds.

Among them, particularly preferred examples are polybutylene succinate using butanediol as the diol component and succinic acid as the dicarboxylic acid component; and polybutylene succinate adipate using butanediol as the diol component and succinic acid and adipic acid as the dicarboxylic acid components. Herein, a blending ratio of succinic acid/adipic acid is preferably ranging from 60/40 to 95/5, more preferably 70/30 to 90/10, even more preferably 75/25 to 85/15 by mass %. In general, a polymeric material having high rigidity is also high in hardness. Thus, if the polymeric material having high rigidity is used as a resin component constituting a cover, a resultant cover becomes fragile, resulting in lowering of durability. However, the polybutylene succinate and the polybutylene succinate adipate are low in hardness for their high rigidity, so that durability can be enhanced when it is used as the resin component constituting the cover. The non-petroleum based polyester resin can be synthesized by a publicly known method for synthesizing a polyester resin.

As the polybutylene succinate or the polybutylene succinate adipate, for example, one having a weight average molecular weight of 50,000 or more and 200,000 or less (preferably 70,000 to 80,000) and a glass transition temperature of $-40°$ C. or more and $-10°$ C. or less (preferably $-20°$ C. to $-30°$ C.), MFR (190° C., load of 2.16 kg) of 2 g/10 min to 30 g/10 min (preferably 5 g/10 min to 20 g/10 min) may be preferably used.

Slab hardness of the non-petroleum based polyester resin is preferably 70 or less, more preferably 68 or less, even more preferably 65 or less in shore D hardness. If the slab hardness of the non-petroleum based polyester resin is more than 70 in shore D hardness, the resultant cover may become too hard, resulting in lowering the durability. A lower limit of the slab hardness of the non-petroleum based polyester resin is not particularly limited, but it is preferably 30 or more, more preferably 35 or more, even more preferably 40 or more in shore D hardness. If the slab hardness of the non-petroleum based polyester resin is less than 30, tackiness is increased, resulting in lowering of resilience. The slab hardness of the non-petroleum based polyester resin can be made to fall in the above range by suitably selecting, for example, the kind of the copolymerization component, the content thereof, and the molecular weight of the polyester resin. For example, a copolymer polyester resin of polylactate, butanediol and succinic acid is excellent in durability due to its low hardness compared with a case where polylactate and polybutylene succinate are mixed.

The golf ball of the present invention comprises a core and a cover covering the core. It is not particularly limited as long as at least either the core or the cover contains, as a resin component, the polyester resin having the non-petroleum based material as the constitutional component. Preferred embodiments of the present invention include an embodiment of a two-piece golf ball comprising a core and a cover covering the core wherein the cover contains the non-petroleum based polyester resin as a resin component; an embodiment of a three-piece golf ball comprising a core consisting of a center and an intermediate layer covering the center and a cover covering the core, wherein at least either the intermediate layer or the cover contains the non-petroleum based polyester resin; an embodiment of a multi-piece golf ball comprising a core consisting of a center and a plurality of intermediate layers covering the center and an outermost layer cover covering the core, wherein at least either the intermediate layer or the outermost layer cover contains the non-petroleum based polyester resin; and an embodiment of a wound-core golf ball comprising a wound core and a cover covering the wound core wherein the cover contains the non-petroleum based polyester resin. In particular, an embodiment in which a cover of a golf ball contains, as a resin component, the non-petroleum based polyester resin is preferred. If the cover contains the non-petroleum based polyester resin as a resin component, durability of the resultant golf ball is further enhanced.

The cover preferably contains, as a resin component, a mixture of the non-petroleum based polyester resin and another petroleum-based thermoplastic resin. By using the mixture of the non-petroleum based polyester and another thermoplastic resin as the resin component of the cover, abrasion-resistance as well as durability of the cover can be improved. Here, the petroleum-based thermoplastic resin means a thermoplastic resin produced from a raw material obtained by subjecting petroleum to purification, catalytic reforming, catalytic cracking or the like, without having a non-petroleum based material as a constitutional component.

Examples of the petroleum-based thermoplastic resin include an ionomer resin, a polyurethane resin, a polystyrene resin, a polyamide resin, a polyester resin and the like. Examples of the ionomer resin include one obtained by neutralizing at least a part of carboxyl groups in a copolymer consisting of ethylene and $\alpha,\beta$-unsaturated carboxylic acid having 3 to 8 carbon atoms with a metal ion, or one obtained by neutralizing at least a part of carboxyl groups in a ternary copolymer consisting of ethylene, $\alpha,\beta$-unsaturated carboxylic acid having 3 to 8 carbon atoms and $\alpha,\beta$-unsaturated carboxylic acid ester with a metal ion, or a mixture thereof.

Specific examples of the ionomer resins include, but not limited to, Himilan 1555 (Na), Himilan 1557 (Zn), Himilan 1605 (Na), Himilan 1706 (Zn), Himilan 1707 (Na), Himilan AM7311 (Mg), and examples of the ternary copolymer ionomer resin include Himilan 1856 (Na) and Himilan 1855 (Zn) available from MITSUI-DUPONT POLYCHEMICAL CO., LTD.

Further, ionomer resins available from DUPONT CO. include Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li), and examples of the ternary copolymer ionomer resin include Surlyn 8120 (Na), Surlyn 8320 (Na), Surlyn 9320 (Zn), and Surlyn 6320 (Mg).

Ionomer resins such as Iotek 8000 (Na), Iotek 8030 (Na), Iotek 7010 (Zn), and Iotek 7030 (Zn) are available from Exxon Co. Examples of the ternary copolymer ionomer resin include Iotek 7510 (Zn) and Iotek 7520 (Zn). The ionomer resins exemplified above can be used alone, or as a mixture of two or more. Na, Zn, K, Li, or Mg described in the parentheses after the commercial name of the ionomer resin represents a kind of metal used for neutralization.

Specific examples of other petroleum-based thermoplastic resins include, for example, a thermoplastic polyamide resin having a commercial name of PEBAX such as "PEBAX 2533" available from ARKEMA Inc, a thermoplastic polyester resin having a commercial name of "HYTREL such as "HYTREL 3548" and "HYTREL 4047" available from DU PONT-TORAY Co, a thermoplastic polystyrene resin having a commercial name of "Rabalon" available from Mitsubishi Chemical Corporation, a thermoplastic polyurethane resin having a commercial name of "ELASTOLLAN" such as "ELASTOLLAN ET880" available from BASF POLUURETHANE ELASTOMERS and the like. Among them, a preferred embodiment is that the cover contains, as a resin component, a mixture of the non-petroleum based polyester resin and at least one kind of petroleum-based thermoplastic resin selected from the group consisting of an ionomer resin, a polyurethane resin, a polystyrene resin, a polyester resin, and a polyamide resin. A more preferable embodiment is that the cover contains a mixture of the non-petroleum based polyester resin and the ionomer resin.

A content of the non-petroleum based polyester resin in the mixture is preferably 30 mass % or more, more preferably 40 mass % or more, even more preferably 50 mass % or more. If the content of the non-petroleum polyester resin is 30 mass % or more, an improvement effect on durability becomes conspicuous. On the other hand, an upper limit of the content of the non-petroleum based polyester resin in the mixture is not particularly limited, but it is preferably 100 mass %, more preferably 95 mass %, even more preferably 90 mass %.

In a preferred embodiment of the present invention, the cover further contains a compatibilizer of the non-petroleum based polyester resin and at least one kind of petroleum-based thermoplastic resin selected from the group consisting of an ionomer resin, a polyurethane resin, a polystyrene resin, a polyester resin, and a polyamide resin. If the non-petroleum based polyester resin and the petroleum-based thermoplastic resin are simply mixed, a phase separation may occur depending on the kind of the petroleum-based thermoplastic resin, resulting in lowering of appearance of the resultant golf ball.

The compatibilizer is not limited as long as it is one that enhances compatibility of the non-petroleum based polyester resin and other petroleum-based thermoplastic resins, and can be suitably selected in accordance with the kind of the petroleum-based thermoplastic resin. Such examples include one obtained by modifying a thermoplastic elastomer such as a polyolefin elastomer, a polyester elastomer, a polyurethane elastomer, a polyamide elastomer, and a polystyrene elastomer with a polar functional group.

Examples of the polar functional group may include a carboxyl group, an epoxy group represented by a glycidyl group, a hydroxyl group, a sulfonate group and the like. By using an elastomer modified with the polar functional group, compatibility of the non-petroleum based polyester resin with other petroleum-based thermoplastic resins can be enhanced.

Specific examples of the compatibilizer include maleic acid-modified SEBS (styrene-ethylene-butylene-styreneblock polymer), maleic acid-modified SEBC styrene-ethylene-butylene-olefin crystalline block polymer), maleic acid-modified PE (polyethylene), methyl methacrylate-glycidyl methacrylate copolymer, ethylene-glycidyl methacrylate copolymer, ethylene-methyl methacrylate-glycidyl methacrylate copolymer, maleic acid-modified PP (polypropylene), maleic acid-modified EVA (ethylene-acetic acid vinyl copolymer), and maleic acid-modified EPDM (ethylene-propylene-diene terpolymer).

The cover of the golf ball of the present invention may contain, in addition to the above mentioned resin components and compatibilizers, a pigment component such as a white pigment (titanium oxide) and a blue pigment, a gravity adjusting agent such as calcium carbonate and barium sulfate, a dispersant, an antioxidant, an ultraviolet absorber, a light stabilizer, a fluorescent material, a fluorescent brightener or the like within a range that does not undermine cover performance.

The content of the white pigment (titanium oxide) is preferably 0.5 part by mass or more, more preferably 1 part by mass or more, and preferably 10 parts by mass or less, more preferably 8 parts by mass or less based on 100 parts by mass of the base resin constituting the cover. The white pigment in an amount of 0.5 part by mass or more can impart opacity to the cover, while the white pigment in an amount of more than 10 parts by mass may lower the durability of the resulting cover.

The cover for the golf ball of the present invention can be prepared by molding the cover composition containing the above-mentioned cover materials. Examples of a method for molding a cover include a method wherein the cover composition is subjected to compression molding into hollow-shell shape, and the core is covered with a plurality of shells (preferably a method wherein a cover composition is compression-molded into hollow-half shell shape and the core is covered with two half shells), and a method wherein the cover composition is subjected to direct injection molding onto the core. In a case of subjecting the cover composition to injection molding directly onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition is charged and then cooled to obtain a cover. For example, the cover composition heated to 200° C. to 250° C. is charged into a mold held under the pressure of 9 MPa to 15 MPa in 0.5 to 5 seconds. After cooling for 10 to 60 seconds, the mold is opened.

Where necessary, the golf ball formed with the cover is preferably subjected to surface treatment such as deburring, cleaning, and sandblast. If desired, a paint film or a mark may be formed.

In the present invention, the golf ball preferably has a cover with a thickness of 3.0 mm or less, more preferably 2.8 mm or less, even more preferably 2.5 mm or less. If the thickness of the cover is 3.0 mm or less, resilience and shot feeling will be improved. A lower limit of the thickness of the cover is not particularly limited, but it is, for example, preferably 0.3 mm, more preferably 0.5 mm, even more preferably 1.0 mm. If it is less than 0.3 mm, it may be difficult to form the cover. Additionally, durability and wear-resistance of the cover may become lowered.

The slab hardness of the cover for a golf ball of the present invention is preferably 40 or more, more preferably 45 or more, even more preferably 50 or more, and preferably 70 or less, more preferably 68 or less, even more preferably 65 or less in shore D hardness. If the slab hardness of the cover is 40 or more, the rigidity of the resultant cover can be enhanced, and the golf ball excellent in resilience (distance) can be obtained. On the other hand, if the slab hardness is 70 or less, the durability can be further enhanced. Herein, the slab hardness of the cover means a hardness obtained by measuring the hardness of the cover composition molded into the sheet shape. The details of the method to measure the slab hardness is described later.

The golf ball of the present invention, if it has a diameter of 42.67 mm to 43 mm, preferably has a compression deformation amount (an amount the golf ball shrinks along the direction of the compression) of 2.0 mm or more, more preferably 2.1 mm or more, even more preferably 2.3 mm or more, and preferably has a compression deformation amount of 3.5 mm or less, more preferably 3.3 mm or less, even more preferably 3.2 mm or less when applying a load from 98 N as an initial load to 1275 N as a final load. If the compression deformation amount is less than 2.0 mm, the shot feeling may become poor due to hardness, while if it is more than 3.5 mm, the resilience may be lowered.

Next, a core or a center in the golf ball of the present invention will be explained. In the core or the center, a conventionally known rubber composition (hereinafter, it may be referred to simply as "rubber composition for the core" in some cases) may be employed. For example, it can be formed by heat-pressing a rubber composition containing a base rubber, a co-crosslinking agent, a crosslinking initiator and a filler.

As the base rubber, a natural rubber and/or a synthetic rubber such as a polybutadiene rubber, a natural rubber, a polyisoprene rubber, a styrene polybutadiene rubber, and ethylene-propylene-diene terpolymer (EPDM) may be used. Among them, typically preferred is the high cis-polybutadiene having cis-1,4 bond in a proportion of 40% or more, more preferably 70% or more, even more preferably 90% or more in view of its superior repulsion property.

As the crosslinking initiator, an organic peroxide is preferably used. Examples of the organic peroxide include an organic peroxide such as dicumyl peroxide, 1,1-bis(t-butylperoxy)-3,5-trimethylcyclohexane, 2,5-dimethyl-2,5-di(t-butylperoxy) hexane, and di-t-butyl peroxide. Among them, dicumyl peroxide is preferably used. An amount of the organic peroxide to be blended is preferably 0.3 part by mass or more, more preferably 0.4 part by mass or more, and preferably 5 parts by mass or less, more preferably 3 parts by mass or less with respect to 100 part by mass of the base rubber. If the content is less than 0.3 part by mass, the core becomes too soft, and the resilience tends to be lowered, and if the content is more than 5 parts by mass, the core becomes too hard and the shot feeling may be lowered.

As the co-crosslinking agent, an α,β-unsaturated carboxylic acid having 3 to 8 carbon atoms or the metal salt thereof may be used. As the metal forming the metal salt, zinc, magnesium, calcium, aluminum, and sodium may be used, and zinc is preferably used because it can provide an enhanced resilience. As the α,β-unsaturated carboxylic acid or the metal salt thereof, for example, acrylic acid, methacrylic acid, zinc acrylate, and zinc methacrylate are preferably used.

An amount of the co-crosslinking agent to be blended in the rubber composition is preferably 10 parts by mass or more, more preferably 15 parts by mass or more, even more preferably 20 parts by mass or more, and preferably 55 parts by mass or less, more preferably 50 parts by mass or less, even more preferably 48 parts by mass or less based on 100 parts by mass of the base rubber. If the amount of the co-crosslinking agent to be used is less than 10 parts by mass, an amount of the organic peroxide to be used needs to be increased so as to obtain an appropriate hardness, thus the resilience tends to be lowered. On the other hand, if the amount of the co-crosslinking agent used is more than 55 parts by mass, the core would become too hard and the shot feeling may be lowered.

As the filler, a filler conventionally formulated in the core of the golf ball may be used. The filler includes, for example, an inorganic salt such as zinc oxide, barium sulfate and calcium carbonate, a high gravity metal powder such as a tungsten powder and a molybdenum powder and the mixture thereof. A content of the filler is preferably 0.5 part by mass or more, more preferably 1 part by mass or more, and is preferably 30 parts by mass or less, more preferably 20 parts by mass or less. If the content is less than 0.5 part by mass, it would be difficult to adjust the gravity, while if the content is more than 30 parts by mass, the ratio of the rubber contained in the whole core becomes low and thus the resilience is lowered.

The rubber composition for the core may further contain an organic sulfur compound, an antioxidant or a peptizing agent, in addition to the base rubber, the co-crosslinking agent, the organic peroxide and the filler.

As the organic sulfur compound, diphenyl disulfide or a derivative thereof may be preferably used. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less based on 100 parts by mass of the base rubber. Examples of the diphenyl disulfide or the derivative thereof include diphenyl disulfide, a mono-substituted diphenyl disulfide such as bis(4-chlorophenyl) disulfide, bis(3-chlorophenyl) disulfide, bis(4-bromophenyl) disulfide, bis(3-bromophenyl) disulfide, bis(4-fluorophenyl) disulfide, bis(4-iodophenyl) disulfide, and bis(4-cyanophenyl) disulfide; a di-substituted diphenyl disulfide such as bis(2,5-dichlorophenyl) disulfide, bis(3,5-dichlorophenyl) disulfide, bis(2,6-dichlorophenyl) disulfide, bis(2,5-dibromophenyl) disulfide, bis(3,5-dibromophenyl) disulfide, bis(2-chloro-5-bromophenyl) disulfide, and bis(2- cyano-5-bromophenyl) disulfide; a tri-substituted diphenyl disulfide such as bis(2,4,6-trichlorophenyl) disulfide, and bis(2-cyano-4-chloro-6-bromophenyl) disulfide; a tetra substituted diphenyl disulfide such as bis(2,3,5,6-tetrachlorophenyl) disulfide; a penta substituted diphenyl disulfide such as bis(2,3,4,5,6-pentachlorophenyl) disulfide and bis(2,3,4,5,6-pentabromophenyl) disulfide. The diphenyl disulfides and the derivatives thereof have some influence on the state of vulcanization of the vulcanized rubber body, and enhance the resilience thereof. Among them, in view of obtaining the golf ball having high resilience, the diphenyl disulfide, and the bis(penta bromophenyl) disulfide are particularly preferred. The amount of the antioxidant to be blended is preferably 0.1 part by mass or more and 1 part by mass or less based on 100 parts by mass of the base rubber. Further, the peptizing agent is preferably 0.1 part by mass or more and 5 parts by mass or less based on 100 parts by mass of the base rubber.

The conditions for press-molding the rubber composition should be determined depending on the rubber composition. The press-molding is preferably carried out for 10 to 60 minutes at a temperature of 130 to 200° C. Alternatively, the press-molding is preferably carried out in a two-step heating, for example, for 20 to 40 minutes at a temperature of 130 to 150° C., and continuously for 5 to 15 minutes at a temperature of 160 to 180° C.

If the golf ball of the present invention is a three-piece golf ball or a multi-piece golf ball, the core, for example, preferably consists of a spherical center having the rubber composition for the core and at least one intermediate layer covering the spherical center. A material constituting the intermediate layer may include, in addition to the non-petroleum based polyester resin, for example, a petroleum-based thermoplastic resin such as a polyurethane resin, an ionomer resin, a polyamide resin, a polystyrene resin, a polyethylene resin, a polyester resin. Specifically, a same material described as the specific examples of other petroleum-based thermoplastic resins contained in the cover of the golf ball of the present invention may be used. The intermediate layer may include, in addition to the resin component, a gravity adjusting agent such as barium sulfate and tungsten, an antioxidant, and a pigment.

The core used for the golf ball of the present invention preferably has a diameter of 36.8 mm or more, more preferably 37.2 mm or more, even more preferably 37.6 mm or more, and preferably 42.2 mm or less, more preferably 41.2 mm or less, even more preferably 40.8 mm or less. If the diameter of the core is less than the above lower limit, the cover becomes so thick that the resilience thereof will be lowered. On the other hand, if the diameter of the core is more than the above upper limit, the thickness of the cover becomes so thin that it will be difficult to form the cover.

If the core has a diameter of 36.8 mm to 42.2 mm, it preferably has a compression deformation amount (an amount the golf ball shrinks along the direction of the compression) of 2.0 mm or more, more preferably 2.1 mm or more, even more preferably 2.3 mm or more, and preferably has a compression deformation amount of 5.0 mm or less, more preferably 4.7 mm or less, even more preferably 4.5 mm or less when applying a load from 98 N as an initial load to 1275 N as a final load. If the compression deformation amount is less than 2.0 mm, the shot feeling becomes bad due to hardness, while if it is more than 5.0 mm, the resilience may be lowered.

It is a preferred embodiment that, the core having a surface hardness larger than the center hardness (if the core is a multi layer core, one having a surface hardness of the outermost layer larger than a center hardness of the center) is used. By making the surface hardness of the core larger than the center hardness, a launch angle is increased and an amount of spin is lowered, so that flying distance is improved. From this viewpoint, a difference in the hardness between a surface and a center of the core used for the golf ball the present invention is preferably 20 or more, more preferably 25 or more, and preferably 40 or less, more preferably 35 or less. If the difference of the hardness is less than the above lower limit, it is difficult to obtain a high launch angle and a low amount of spin, so that the flying distance tends to be lowered. Further, impact strength when hitting the golf ball becomes large so that it is difficult to obtain a good soft shot feeling. On the other hand, if the difference in hardness is more than the above upper limit, the durability tends to be lowered.

The center hardness of the core is preferably 30 D or more, more preferably 32 D or more, even more preferably 35 D or more, and preferably 50 D or less, more preferably 48 D or less, even more preferably 45 D or less in shore D hardness. If the center hardness is less than the above lower limit, the golf ball tends to become so soft that the resilience will be lowered, while if the center hardness is more than the above upper limit, the golf ball becomes so hard that the shot feeling and launch angle become lowered, and the amount of spin also becomes larger so that the flying performance become lowered. In the present invention, the center hardness of the core means the hardness obtained by measuring the central point of the cut surface of the core cut into halves with the Shore D type spring hardness tester.

The surface hardness of the core is preferably 45 D or more, more preferably 50 D or more, even more preferably 55 D or more, and preferably 65 D or less, more preferably 62 D or less, even more preferably 60 D or less. If the surface hardness is less than the above lower limit, the golf ball may become too soft, resulting in lowering of resilience and launch angle, or the amount of spin may become too large, resulting in lowering of flying performance. If the surface hardness is larger than the upper limit, the golf ball may become too hard, resulting in lowering of the shot feeling. In the present invention, the surface hardness of the core means the hardness obtained by measuring a surface of the resultant spherical core using the Shore D type spring hardness tester. If the core has a multi layer structure, the surface hardness of the core means a hardness of a surface of the outermost layer of the core.

When preparing a wound-core golf ball in the present invention, a wound core may be used as the core. In that case, for example, a wound core comprising a center formed by curing the above rubber composition for the core and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

Examples

Hereinafter, the present invention will be described in more detail with reference to Examples, but the present invention is not restricted by the following Examples and can be suitably modified within the scope described above or below and such modifications are also included in the technical scope of the present invention.

[Evaluation Method]

(1) Abrasion-Resistance

A commercially available pitching wedge was installed on a swing robot available from TRUETEMPER CO., and two points of a ball respectively were hit once at the head speed of 36 m/sec. to observe the portions which were hit. Abrasion-resistance was evaluated and ranked into three levels based on following criteria.

G (Good): Almost no scratch was present on the surface of the golf ball, or slight scratches were present on the surface of the golf ball.

F (Fair): The surface of the golf ball was abraded a little, and scuffing could be observed.

P (Poor): The surface of the golf ball was abraded considerably, and scuffing was conspicuous.

(2) Durability

Each golf ball was repeatedly hit with a metal head driver (W#1) attached to a swing robot manufactured by TRU-ETEMPER CO, at the head speed of 45 m/sec. to make the golf ball collide with a collision board. Times up to which the golf balls are cracked were measured. In addition, each value obtained was reduced to an index number relative to the measured value obtained in Golf ball No. 11 being assumed 100. The larger number indicates better durability.

(3) Slab Hardness (Shore A Hardness or Shore D Hardness)

Using the cover composition, a sheet having a thickness of about 2 mm were prepared by hot press molding and preserved at the temperature of 23° C. for two weeks. Three or more of the sheets were stacked on one another to avoid being affected by the measuring substrate on which the sheets were placed, and the stack was subjected to the measurement using P1 type auto hardness tester provided with the Shore A type or Shore D type spring hardness tester prescribed by ASTM-D2240, available from KOUBUNSHI KEIKI CO., LTD.

(4) Compression Deformation Amount (mm)

The compression deformation amount (amount the golf ball shrinks along the compression direction: mm) of the golf balls or the spherical cores was measured when applying a load from 98 N (10 kgf) as an initial load to 1275 N (130 kgf) as a final load to the golf balls or the cores.

(5) Core Hardness

JIS-C hardness obtained by measuring a surface part of the spherical core using C type spring hardness tester specified by JIS-K 6301 was determined as the surface hardness, and JIS-C hardness measured by cutting a spherical core into hemispherical shape to measure a center of a cut surface thereof was determined as the center hardness of the core.

[Preparation of Golf Ball]

(1) Preparation of Core

The rubber composition for the center shown in Table 1 was kneaded, and was subjected to heat-pressing for 15 minutes in the upper and lower molds having a spherical cavity at the temperature of 170° C. to obtain a center in a spherical shape. In a case of preparing a two-piece golf ball, the spherical center was directly used as a core.

In preparing a three-piece golf ball, the intermediate composition shown in Table 1 was mixed in a twin-screw kneading extruder to prepare the composition for intermediate layer into the form of the pellet. Extrusion was carried out in the following conditions: screw diameter of 45 mm, screw revolutions of 200 rpm, and screw L/D=35. The material was heated at a temperature between 150° C. and 230° C. at the die position of the extruder. The multi layer core having a center and an intermediate layer covering the center (having a thickness of 1 mm) was prepared by directly inject-molding the obtained material for the intermediate layer onto the center thus obtained.

TABLE 1

| Core | A | B | C |
|---|---|---|---|
| Center | | | |
| Rubber composition for center | — | — | — |
| BR-730 | — | 100 | 100 |
| BR-51 | 88 | — | — |
| IR-2200 | 12 | — | — |
| Zinc acrylate | 25 | 25 | 25 |
| Zinc oxide | 5 | 5 | 5 |
| Dicumyl peroxide | 0.6 | 0.5 | 0.5 |
| Diphenyl disulfide | — | 0.9 | 0.9 |
| Barium sulfate | Appropriate amount | Appropriate amount | Appropriate amount |
| Intermediate layer | | | |
| Himilan 1605 | — | — | 50 |
| Himilan AM7239 | — | — | 50 |
| Slab hardness | — | — | 62 |
| Thickness of intermediate layer (mm) | — | — | 1 |
| Core properties | | | |
| Diameter of core (mm) | 38.2 | 39.6 | 39.6 |
| Compression deformation amount of core (mm) | 3.45 | 3.65 | 3.1 |
| Center hardness of core (JIS-C hardness) | 66 | 61 | 66 |
| Surface hardness of core (JIS-C hardness) | 83 | 79 | 83 |

Composition: part by mass

Notes on Table 1

BR730: high cis-polybutadiene manufactured by JSR Corporation (cis content of 96% or more).
BR-51: high cis-polybutadiene manufactured by JSR Corporation (cis content of 96% or more).
IR-2200: isoprene rubber manufactured by ZEON CORPORATION (cis content of 98% or more)
Zinc acrylate: ZNDA-90S manufactured by NIHON JYORYU KOGYO Co., LTD.
Zinc oxide: "Ginrei R" manufactured by Toho-Zinc Co.
Dicumyl peroxide: Percumyl D manufactured by NOF Corporation.
Diphenyl disulfide: manufactured by Sumitomo Seika Chemicals Company Limited
Barium sulfate: barium sulfate BD manufactured by Sakai Chemical Industry Co., Ltd.
Himilan 1605: sodium ion-neutralized ethylene-methacrylic acid copolymer ionomer resin manufactured by MITSUI-DUPONT POLYCHEMICAL CO., LTD.
Himilan AM7329: zinc ion-neutralized ethylene-methacrylic acid copolymer-based ionomer resin manufactured by MITSUI-DUPONT POLYCHEMICAL (2) Preparation of Cover Composition and Golf Ball Body The cover materials shown in Table 2 were mixed using a twin-screw kneading extruder to obtain the cover composition in the form of pellet. The extrusion was conducted in the following conditions: screw diameter=45 mm, screw revolutions=200 rpm, screw L/D=35, and the cover composition was heated to from 150° C. to 230° C. at the die position of the extruder. Subsequently, the resultant cover composition was injection-molded directly onto the core thus obtained to form the cover covering the core. The upper and lower molds for forming the cover have a spherical cavity with dimples. The part of the dimples can serve as a hold pin which is retractable. When forming the golf ball body, the hold pins were protruded to hold the core, and the resin heated at 210° C. was charged into the mold held under the pressure of 80 tons for 0.3 seconds. After the cooling for 30 seconds, the molds were opened and then the golf ball was discharged. The surface of the obtained golf ball body was subjected to sandblast treatment and marking followed by coating a clear paint, drying at the temperature of 40° C. in an oven to dry the paint to obtain a golf ball having a diameter of 42.7 mm and a mass of 45.4 g.

The results of evaluating the resultant golf ball with respect to abrasion-resistance, durability, and compression deformation amount thereof are shown in Table 2.

TABLE 2

| Golf ball No. | 1 | 2 | 3 | 4 | 5 | 6 | 7 | 8 | 9 | 10 | 11 |
|---|---|---|---|---|---|---|---|---|---|---|---|
| Core composition | A | B | B | B | B | B | C | C | A | A | A |
| Cover composition | | | | | | | | | | | |
| Non-petroleum based polyester resin 1 | 100 | — | — | — | — | — | — | — | — | — | — |
| Non-petroleum based polyester resin 2 | — | 100 | — | 60 | 30 | 20 | 60 | — | — | — | — |
| Non-petroleum based polyester resin 3 | — | — | 100 | — | — | — | — | — | — | — | — |
| Lacea H100-J | — | — | — | — | — | — | — | — | — | 100 | — |
| Lacea M-151S Q52 | — | — | — | — | — | — | — | — | 100 | — | — |
| Cellgreen | — | — | — | — | — | — | — | 100 | — | — | — |
| Himilan 1605 | — | — | — | 20 | 35 | 40 | 20 | — | — | — | 60 |
| Himilan 1557 | — | — | — | 20 | 35 | 40 | 20 | — | — | — | 40 |
| Compatibilizer | — | — | — | 5 | 5 | 5 | 5 | — | — | — | — |
| Titanium dioxide | 4 | 4 | 4 | 4 | 4 | 4 | 4 | 4 | 4 | 4 | 4 |
| Slab hardness (Shore D) | 65 | 56 | 46 | 58 | 59 | 60 | 58 | 61 | 76 | 84 | 60 |
| Thickness (mm) | 2.3 | 1.6 | 1.6 | 1.6 | 1.6 | 1.6 | 1.6 | 1.6 | — | 2.3 | 2.3 |
| Impact resilience | 57 | 59 | 48 | 57 | 57 | 56 | 57 | 56 | Unable to measure | 48 | 51 |
| Properties | | | | | | | | | | | |
| Compression deformation amount (mm) | 2.5 | 3.24 | 3.37 | 3.16 | 3.11 | 3.08 | 2.70 | 3.05 | 2.25 | 2.05 | 2.70 |
| Abrasion-resistance | P | P | P | G | G | G | G | P | F | F | G |
| Durability | 144 | 144 | 120 | 115 | 107 | 102 | 105 | 42 | 1 | 1 | 100 |

Composition: part by mass
Notes on Table 2
Lacea H100-J: polylactate resin manufactured by Mitsui Chemicals, Inc.
Lacea M-151S Q52: a mixture of a polylactate resin and an aliphatic dicarboxylic acid polyester resin manufactured by Mitsui Chemicals, Inc.
Non-petroleum based polyester resin 1: butanediol/succinic acid (non-petroleum based material) copolymerized polyester resin (polybutylene succinate) having succinic acid in an amount or 50% or more by mass
Non-petroleum based polyester resin 2: butanediol/succinic acid (non-petroleum based material)/adipic acid copolymerized polyester resin (polybutylene succinate adipate) wherein a blending ratio of succinic acid/adipic acid is 80/20 by mass %.
Non-petroleum based polyester resin 3: polylactate/butanediol/succinic acid (non-petroleum based material) copolymerized polyester resin having a commercial name of "Plamate PD-150" available from DAINIPPON INK AND CHEMICALS, INCORPORATED
Cellgreen: Cellgreen CBS171 (butanediol/succinic acid/caprolactone) manufactured by DAICEL CHEMICAL INDUSTRIES, LTD. It is to note that all the components consist of petroleum based materials
Himilan 1605: sodium ion-neutralized ethylene-methacrylic acid copolymerized ionomer resin manufactured by MITSUI-DUPONT POLYCHEMICAL CO., LTD.
Himilan 1557: zinc on-neutralized ethylene-methacrylic acid copolymerized ionomer resin manufactured by MITSUI-DUPONT POLYCHEMICAL CO., LTD.
Compatibilizer: epoxy group-modified methyl polymethacrylate Golf ball Nos. 1 to 3 are cases in which the resin components of the cover consisted of a polyester resin having a non-petroleum based material as a constitutional component. They exhibited further improved durability compared with Golf ball No. 11 using an ionomer resin which has been conventionally used. Golf ball Nos. 4 to 7 are cases in which the cover contained, as a resin component, a mixture of the non-petroleum based polyester resin and a (petroleum-based) ionomer resin, and further contained a compatibilizer of the non-petroleum based polyester resin and an ionomer resin. They exhibited improved abrasion-resistance as well as durability. Golf ball No. 8 is a case in which polycaprolactone devoid of a non-petroleum based material alone was used as a resin component of the cover, which exhibited lowered durability compared with Golf ball No. 11 using an ionomer resin which has conventionally been used. Golf ball No. 9 is a case in which a mixture of a polylactate resin and aliphatic carboxylic acid was used as a resin component for the cover, in which durability at a practical level could not be obtained. Golf ball No. 10 was a case in which a polylactate resin was used as a resin component of the cover, in which durability at a practical level could not be obtained same as Golf ball No. 9.

The present invention can improve durability and abrasion-resistance of the golf ball.

This application is based on Japanese Patent application No. 2,006-356,549 filed on Dec. 28, 2006, the contents of which are hereby incorporated by reference.

What is claimed is:

1. A golf ball comprising a core and a cover covering the core,
   wherein the cover contains a mixture of a copolymer polyester resin and an ionomer resin as a resin component and an expoxy group modified methacrylic resin as a compatibilizer;
   wherein the copolymer polyester resin has, as a constitutional components, a dicarboxylic acid, a diol, and a hydroxyl carboxylic acid, and at least one of the dicarboxylic acid, the diol, and the hydroxyl carboxylic acid is a non-petroleum based material,
   wherein the copolymer polyester resin is composed of succinic acid as the dicarboxylic acid, butanediol as the diol, and lactic acid as the hydroxyl carboxylic acid; and,
   the copolymer polyester resin has slab hardness of 70 or less in shore D hardness.

2. The golf ball according to claim 1, wherein the compatibilizer is at least one of methyl methacrylate-glycidyl methacrylate copolymer, ethylene-glycidyl methacrylate copolymer, and ethylene-methyl methacrylate-glycidyl methacrylate copolymer.

3. A golf ball comprising a core and a cover covering the core,
   wherein the cover contains a mixture of a copolymer polyester resin and an ionomer resin component as a resin component and an expoxy group modified (meth)acrylic resin as a compatibilizer;
   wherein the copolymer polyester resin has, as a constitutional components, a dicarboxylic acid, a diol, and hydroxyl carboxylic acid, and at last one of the dicarboxylic acid, the diol, and the hydroxyl carboxylic acid is a non-petroleum based material, wherein the copolymer polyester resin is composed of succinic acid and adipic acid as the dicarboxylic acid, butanediol as the diol, and lactic acid as the hydroxy carboxylic acid; and the copolymer polyester resin has slab hardness of 70 or less in shore D hardness.

4. The golf ball according to claim 3, wherein the compatibilizer is at least one of the methyl methacrylate-glycidyl methacrylate copolymer, ethylene-glycidyl methacrylate copolymer, and ethylene-methyl methacrylate-glycidyl methacrylate copolymer.

* * * * *

UNITED STATES PATENT AND TRADEMARK OFFICE
CERTIFICATE OF CORRECTION

| | |
|---|---|
| PATENT NO. | : 8,063,145 B2 |
| APPLICATION NO. | : 12/005378 |
| DATED | : November 22, 2011 |
| INVENTOR(S) | : Satoko Okabe |

It is certified that error appears in the above-identified patent and that said Letters Patent is hereby corrected as shown below:

IN THE CLAIMS:

In claim 1, at column 14, line numbered 43, change "expoxy" to --epoxy--.

In claim 3, at column 14, line numbered 64, change "expoxy" to --epoxy--.

Signed and Sealed this
Eighteenth Day of August, 2015

Michelle K. Lee
*Director of the United States Patent and Trademark Office*